Figure 1:
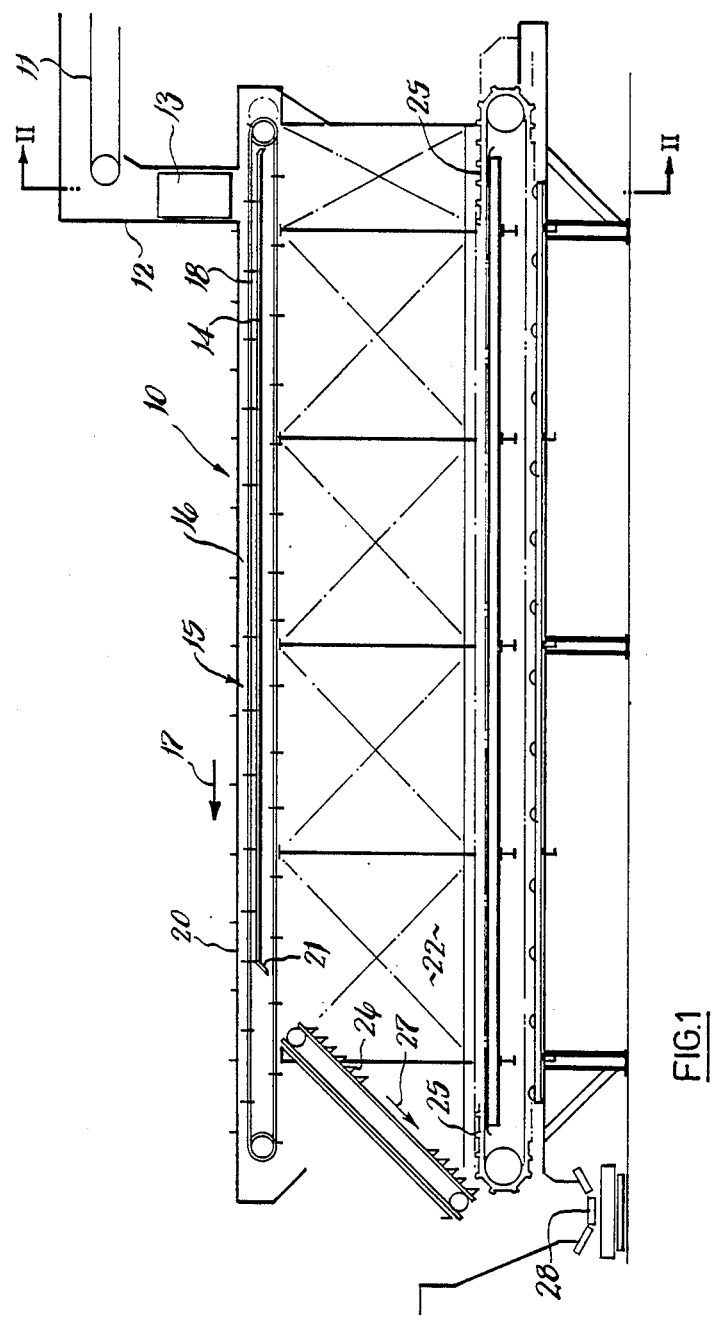

United States Patent [19]

Finch

[11] Patent Number: 4,838,750
[45] Date of Patent: Jun. 13, 1989

[54] STORAGE BUNKER

[75] Inventor: Maurice Finch, Rushwick, England

[73] Assignee: Henley Burrowes & Company Limited, Worcester, England

[21] Appl. No.: 28,704

[22] Filed: Mar. 20, 1987

[51] Int. Cl.⁴ .............................................. B65G 65/30
[52] U.S. Cl. .................................... 414/300; 100/151; 198/550.13; 198/560; 414/327
[58] Field of Search ............... 414/293, 299, 300, 304, 414/325, 327, 294; 198/560, 561, 550.13, 623; 100/151, 152, 118

[56] References Cited

U.S. PATENT DOCUMENTS

| 2,717,703 | 9/1955 | Kull et al. ...................... 414/327 X |
| 3,719,290 | 3/1973 | Voigtläender ....................... 414/327 |
| 3,780,886 | 12/1973 | Allen .............................. 414/327 X |
| 4,304,326 | 12/1981 | Fowler ................................. 198/623 |
| 4,504,182 | 3/1985 | Bürkner .............................. 414/327 |
| 4,676,711 | 6/1987 | Burgess, Jr. et al. ........... 198/623 X |

FOREIGN PATENT DOCUMENTS

| 151507 | 9/1982 | Japan ................................ 414/293 |
| 846466 | 7/1981 | U.S.S.R. ........................... 414/327 |
| 375227 | 6/1932 | United Kingdom . |
| 580706 | 9/1946 | United Kingdom . |
| 681025 | 10/1952 | United Kingdom . |
| 698091 | 10/1953 | United Kingdom . |
| 781877 | 8/1957 | United Kingdom ........... 414/293 |
| 992092 | 5/1965 | United Kingdom . |
| 1062487 | 3/1967 | United Kingdom . |
| 1092148 | 11/1967 | United Kingdom . |

Primary Examiner—David A. Bucci
Attorney, Agent, or Firm—Nies, Webner, Kurz & Bergert

[57] ABSTRACT

A storage bunker for substantially dry and loose material such as shredded paper waste has a receptacle (10) and a conveyor (16,18) feeding material over a fixed plate (14) broken at (21) to permit the material to fall into the receptacle. The return run of conveyor (16) compacts material towards the other end of the receptacle, and the whole mass of material once the receptacle is filled is driven by conveyor (25) towards an outlet, with material being stripped from the mass by an inclined toothed conveyor (26) for collection by a troughed conveyor (28).

5 Claims, 2 Drawing Sheets

STORAGE BUNKER

THIS INVENTION concerns a storage bunker for substantially dry and loose materials such as shreaded paper waste, and provides a receptacle in which the material may be stored and at least partially compacted and withdrawn when required for further handling and disposal.

Many devices are known for storing materials such as shreaded paper waste. These include a storage bin having a number of conveying screws at its base operating in different directions to keep the material in motion and preventing it from bridging at the bottom of the bin. Another device is a storage silo with a tapering hopper at its base and having a number of screw conveyors projecting into the waste to discharge it from the silo. A further known device comprises a scraper conveyor which collects material and deposits it into a bunker having screw conveyors at the base for discharging the material.

The principal disadvantage with these kinds of known storage facility is that they include no means for compacting the material thus to maximise the storage capacity.

An object of the present invention is to provide a storage bunker which is capable of storing and compacting large volumes of materials.

According to the present invention there is provided a storage bunker for substantially dry and loose materials such as shreaded paper waste, comprising a receptacle having its longitudinal axis or major dimension generally horizontal, means for feeding material to the bunker at one end thereof, means within the bunker for feeding accumulated material therein towards the other end, further means within the bunker in a base region thereof for conveying compacted material forwardly towards said one end at which the material is discharged from the bunker by further conveying means.

Figure 2:
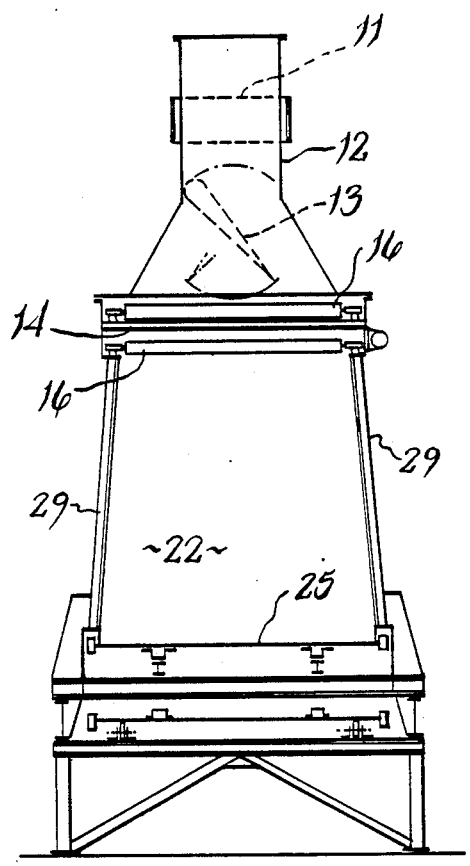

An embodiment of the invention will now be described, by way of example only, with reference to the accompanying drawings, in which:

FIG. 1 is a partially-sectioned elevation of a storage bunker made in accordance with the invention; and FIG. 2 is a vertical section along line II—II of FIG. 1.

The bunker comprises a receptacle generally indicated at 10 and being typically some 40 meters long and about 6 meters high internally. An input conveyor 11 carries materials such as shreaded paper waste to be stored and compacted into a chute 12 containing a pivotable and reciprocating distributor flap 13 which spreads the material substantially evenly across a plate 14 which extends longitudinally over the top of the bunker 10 to form a ceiling thereto. A scraping and levelling conveyor 15 having a number of spaced upstanding flights 16 are driven forwardly in the direction of arrow 17 by a pair of driven chains 18. The flights 16 serve to drive the material forwardly on plate 14 which, due to the restricted height between the plate and a fixed top 20, causes the material to assume a substantially constant depth.

At 21, the plate 14 is broken to permit access to the interior 22 of the bunker, and at this point the material is deposited by gravity into the bunker. Accumulated material within the bunker fills to a height at which it is driven backwards along the bunker by the return run of flights 16. Thus compaction takes place to a level of between 1½–1 to 4–1.

Continuously or intermittently, substantially the whole body of material within the bunker is carried forwards by a belt plate conveyor 25 forming a floor to the bunker interior 22, towards the discharge end, the material being "stripped" off the compacted mass thereof by the bottom run of an inclined toothed conveyor belt 26 moving in the direction of arrow 27, this conveyor serving to define a wedge-like front end of the bunker space. The material stripped from the bunker by conveyor 26 may be deposited onto a troughed conveyor 28 or any other suitable means for transferring the material from the output end of the bunker to, say, an incinerator or pelleting press.

It will be seen from FIG. 2 that the side walls 29 of the bunker diverge towards its base thus ensuring that material will always descend towards belt plate conveyor 25.

The conveyor 25 may be driven intermittently or continuously and at variable speed depending upon the required dischage rate. Similarly, the speed at which conveyor flights 16 are driven may be varied during operation to control the feed rate to the bunker. For this purpose, proximity devices may be provided at spaced positions along the bunker and throughout its height thus to control the input and output of materials.

Liquor sprays may be incorporated close to material input point 21 to control the condition of the material entering the bunker.

It is expected that a bunker having the dimensions mentioned above will be capable of containing some 25 to 35 tons of material by virtue of the compaction provided. Drive motors for conveyors 11, 15, 25 and 26 may be of a low horsepower rating since none drives more than a light load. The system is, therefore, inexpensive to operate and maintain.

I claim:

1. A storage bunker for substantially dry and loose materials such as shredded paper waste, comprising a receptacle having an interior, a top, and a longitudinal axis or major dimension generally horizontal, first conveyor means for feeding the material into the receptacle at one end thereof, second conveyor means within an upper region of the receptacle for driving material accumulated therein towards an opposite end thereof so as to compact same therein, third conveyor means forming a floor of the receptacle for conveying compacted material forwardly and horizontally towards an output end thereof at said one end of the receptacle, and an output conveyor at said one end in the form of an inclined toothed conveyor band disposed so as to define a wedge-like front end of the receptacle, a toothed lower run of the output conveyor toward the interior of the receptacle moving downwardly and serving to strip material from a compacted mass thereof downwardly into an outlet at the output end of the third conveyor means, said first conveyor means including a plate extending longitudinally over the top of the receptacle to form a ceiling thereto, said first conveyor means having spaced upstanding flights driven in one direction towards said one end of the receptacle thus serving as a scraping and levelling conveyor, there being a zone of restricted height between the plate and a fixed top above the plate, through which said flights travel to convey the material thus to cause the material to assume a substantially constant depth, said plate being broken at said one end of the receptacle to permit the material to enter the interior of the receptacle at a point toward the interior of the receptacle relative to an upper end of the output conveyor, said first and second conveyor means being commonly mounted on a pair of pulleys at opposite ends of said first and second conveyor means, a first one of said pulleys being located outwardly of the upper end of the output conveyor and with a second of said pulleys located in proximity to said opposite end of the receptacle.

2. A storage bunker according to claim 1, wherein said second conveyor means for feeding accumulated material towards the other end of the receptacle is provided by a return run of said first conveyor means, with spaced flights moving in one direction towards the other end within the receptacle.

3. A storage bunker according to claim 1, wherein means provided to enable the third conveyor means to be selectively driven intermittently or continuously, and at a variable speed according to the required discharge rate.

4. A storage bunker according to claim 1, wherein said receptacle includes a pair of opposed longitudinal side walls diverging towards its base.

5. A storage bunker according to claim 1, including an input conveyor feeding an inlet chute in which there is positioned a pivotable and reciprocating distributor flap means to spread material substantially evenly across the first conveyor means.

* * * * *